US010127245B2

(12) United States Patent
Jurca

(10) Patent No.: US 10,127,245 B2
(45) Date of Patent: **\*Nov. 13, 2018**

(54) SYSTEMS, METHODS, AND COMPUTER-READABLE MEDIA FOR INTERPRETING GEOGRAPHICAL SEARCH QUERIES

(71) Applicant: GOOGLE INC., Mountain View, CA (US)

(72) Inventor: Radu Jurca, Adliswil (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/682,083

(22) Filed: Aug. 21, 2017

(65) Prior Publication Data

US 2017/0344582 A1 Nov. 30, 2017

Related U.S. Application Data

(63) Continuation of application No. 13/801,023, filed on Mar. 13, 2013, now Pat. No. 9,753,945.

(51) Int. Cl.
*G06F 17/30* (2006.01)
(52) U.S. Cl.
CPC .............................. *G06F 17/30241* (2013.01)
(58) Field of Classification Search
CPC .............................................. G06F 17/30241
See application file for complete search history.

(56) References Cited

U.S. PATENT DOCUMENTS

| | | | |
|---|---|---|---|
| 2003/0061211 A1 | 3/2003 | Shultz et al. | |
| 2004/0236730 A1 | 11/2004 | Frank | |
| 2006/0149734 A1* | 7/2006 | Egnor | G06F 17/3087 707/999.007 |
| 2009/0019028 A1* | 1/2009 | Norris | G06F 17/3087 707/999.003 |
| 2011/0113064 A1 | 5/2011 | Govindachetty et al. | |
| 2011/0144973 A1* | 6/2011 | Bocchieri | G06F 17/289 704/2 |

(Continued)

FOREIGN PATENT DOCUMENTS

| | | |
|---|---|---|
| GB | 2460045 A | 11/2009 |
| JP | 2011-134256 A | 7/2011 |
| KR | 2011024571 | 3/2011 |

OTHER PUBLICATIONS

International Preliminary Report on Patentability for Application No. PCT/US2014/019529, dated Sep. 15, 2015.

(Continued)

*Primary Examiner* — Dinku W Gebresenbet
(74) *Attorney, Agent, or Firm* — Marshall, Gerstein & Borun LLP

(57) ABSTRACT

Systems, methods, and computer-readable media for interpreting geographical search queries are provided. Query templates for geographical search queries are generated from search logs of previously executed geographical search queries. Unique queries are extracted from the search logs and interpretations for these queries are obtained. Based on these interpretations, query templates having an arrangement of term types are extracted. Additionally, probability distributions for the query templates for a context, such as a locale, language, client type, etc., are determined.

18 Claims, 9 Drawing Sheets

(56) References Cited

U.S. PATENT DOCUMENTS

2011/0208730 A1    8/2011    Jiang et al.
2012/0295633 A1   11/2012   Yom-Tov et al.
2014/0172899 A1    6/2014    Hakkani-Tur et al.

OTHER PUBLICATIONS

Michalowski et al., "Retrieving and Semantically Integrating Heterogeneous Data from the Web," IEEE Intelligent Systems, May/Jun. 2004, pp. 72-79, IEEE Computer Society, US.

Thomson Search Services, Oct. 14, 2011, pp. 1-15, US.

Analysis of Geographic Queries in a Search Engine Log, Proceedings to the First International Workshop on Location and the Web, Locweb '08, Apr. 22, 2008, pp. 49-56.

Geomodification of Query Rewriting, Department of Geography, University of Zurich, <http://www.geo.unizh.ch/~rsp/gir06/papers/individual/zhang_jones.pdf>, Aug. 10, 2006, pp. 1-5.

International Search Report & Written Opinion for PCT App. No. PCT/US2014/019529, dated Jul. 7, 2014 (pp. 1-10).

Office Action issued in U.S. Appl. No. 13/801,023 dated Mar. 26, 2015.

Office Action issued in U.S. Appl. No. 13/801,023 dated Dec. 2, 2015.

Office Action issued in U.S. Appl. No. 13/801,023 dated Apr. 21, 2016.

Office Action issued in U.S. Appl. No. 13/801,023 dated Nov. 3, 2016.

Office Action issued in U.S. Appl. No. 13/801,023 dated Feb. 27, 2017.

\* cited by examiner

| Feature type | Query template | Language | Country | Count | Type |
|---|---|---|---|---|---|
| ROUTE | ROUTE_LOCALITY | ENGLISH | USA | 1500 | DESKTOP |
| | | | | | |
| | | | | | |
| | | | | | |
| | | | | | |
| | | | | | |

FIG. 4

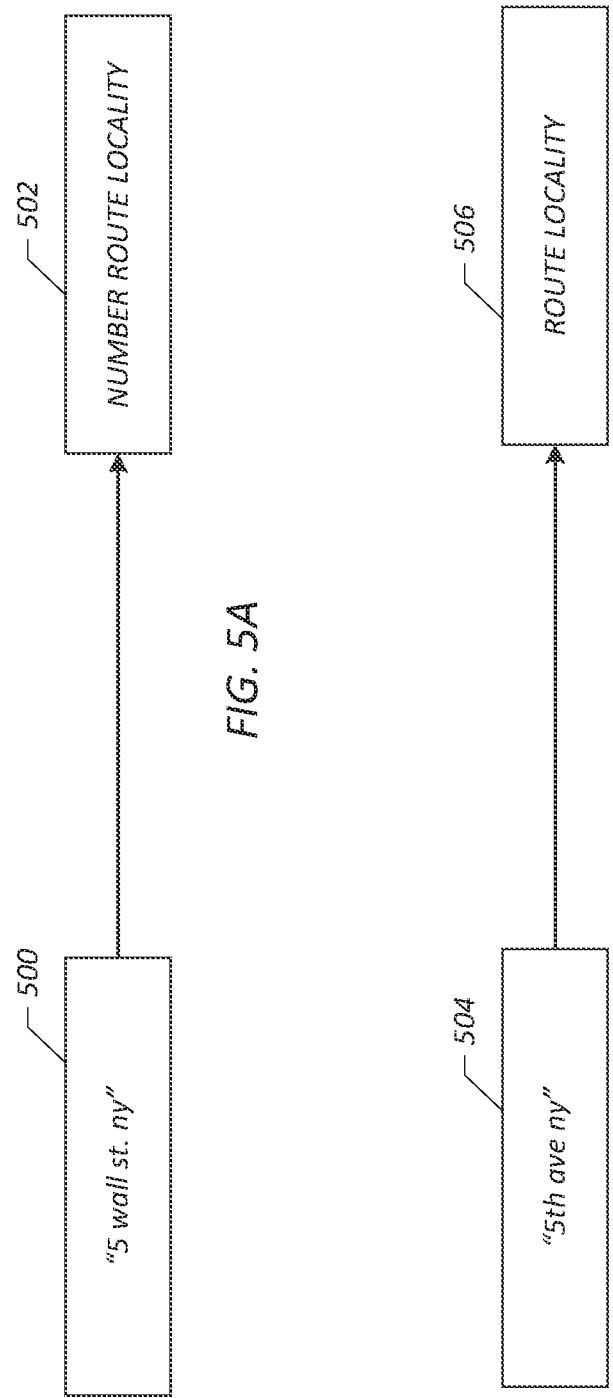

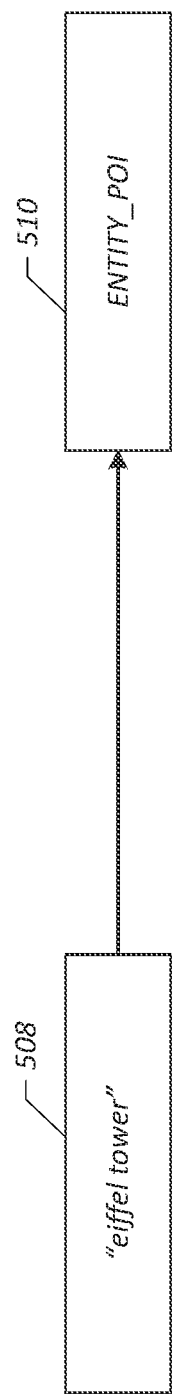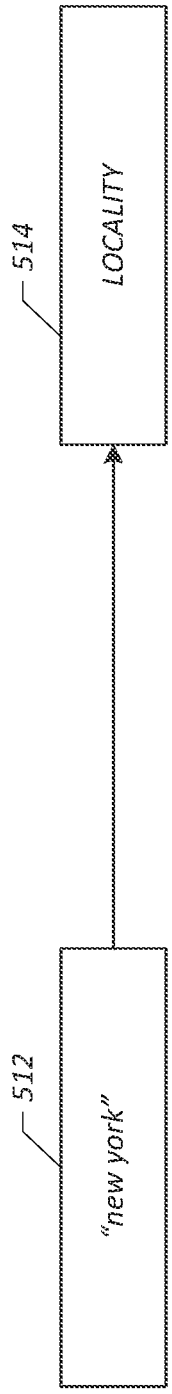
FIG. 5C
FIG. 5D

SYSTEMS, METHODS, AND COMPUTER-READABLE MEDIA FOR INTERPRETING GEOGRAPHICAL SEARCH QUERIES

CROSS-REFERENCE TO RELATED APPLICATIONS

This application is a continuation of and claims priority to U.S. patent application Ser. No. 13/801,023 filed on Mar. 13, 2013 and entitled "Systems, Methods, and Computer-Readable Media for Interpreting Geographical Search Queries," the entire disclosure of which is hereby expressly incorporated by reference herein.

BACKGROUND OF THE INVENTION

1. Field of the Invention

This invention relates generally to computer-implemented searching of geographic areas and more particularly to processing queries for searching geographic areas.

2. Description of the Related Art

The Internet provides many different types of information and is useful for a variety of purposes. For example, users may use the Internet to retrieve information about businesses or other entities, view interactive maps, search for geographic areas, etc. Users searching a geographic area may user interactive maps and web search engines to enter a query, such as an address, and receive results, such as an indicator on an interactive map. However, such users may be from different countries, may use different languages, and may enter queries using different words and arrangements of words. As a result, the queries received from such users may have varying structures and may be difficult to interpret. The difficulties in interpreting such queries may result in providing incorrect and inaccurate responses to the queries. Furthermore, incorrect and inaccurate interpretations may result in users entering longer and more specific queries in order to obtain correct and accurate results.

SUMMARY OF THE INVENTION

Various embodiments of systems, methods, and computer-readable media for interpreting geographical search queries are provided herein. In some embodiments, a computer-implemented method for interpreting geographical search queries is provided. The computer-implemented method includes obtaining, by one or more processors a plurality of geographical search queries from a log of executed geographical search queries, each of the plurality of geographical search queries comprising one or more terms and determining by one or more processors, a plurality of query templates based on the plurality of geographical search queries, each of the plurality of query templates comprising one or more term types determined from the one or more terms. The computer-implemented method further includes determining, by one or more processors, a probability distribution for the query templates for a context and storing, on a memory accessible by the one or more processors, the plurality of query templates and the probability distribution. Finally, the computer-implemented method also includes providing, by one or more processors, the plurality of query templates as a plurality of interpretation candidates for interpreting a geographical search query received from a client computer.

Additionally, a non-transitory tangible computer-readable storage medium having executable computer code stored thereon for interpreting geographical search queries is provided. The code includes a set of instructions that causes one or more processors to perform the following: obtaining, by one or more processors a plurality of geographical search queries from a log of executed geographical search queries, each of the plurality of geographical search queries comprising one or more terms and determining by one or more processors, a plurality of query templates based on the plurality of geographical search queries, each of the plurality of query templates comprising one or more term types determined from the one or more terms. The code further includes a set of instructions that causes one or more processors to perform the following: determining, by one or more processors, a probability distribution for the query templates for a context and storing, on a memory accessible by the one or more processors, the plurality of query templates and the probability distribution. Finally, the code also includes a set of instructions that causes one or more processors to perform the following: also includes providing, by one or more processors, the plurality of query templates as a plurality of interpretation candidates for interpreting a geographical search query received from a client computer.

In some embodiments, a system for interpreting geographical search queries is provided. The system includes one or more processors and non-transitory memory accessible by the one or more processors, the memory having computer code stored thereon. The code includes a set of instructions that causes one or more processors to perform the following: obtaining, by one or more processors a plurality of geographical search queries from a log of executed geographical search queries, each of the plurality of geographical search queries comprising one or more terms and determining by one or more processors, a plurality of query templates based on the plurality of geographical search queries, each of the plurality of query templates comprising one or more term types determined from the one or more terms. The code further includes a set of instructions that causes one or more processors to perform the following: determining, by one or more processors, a probability distribution for the query templates for a context and storing, on a memory accessible by the one or more processors, the plurality of query templates and the probability distribution. Finally, the code also includes a set of instructions that causes one or more processors to perform the following: also includes providing, by one or more processors, the plurality of query templates as a plurality of interpretation candidates for interpreting a geographical search query received from a client computer.

BRIEF DESCRIPTION OF THE DRAWINGS

FIG. 4 is a block diagram illustrating a data structure for transmitting or storing query templates in accordance with an embodiment of the present invention;

FIGS. 5A-5D are block diagrams depicting geographical search queries and corresponding interpretation candidates/query templates in accordance with an embodiment of the present invention;

Figure 1:
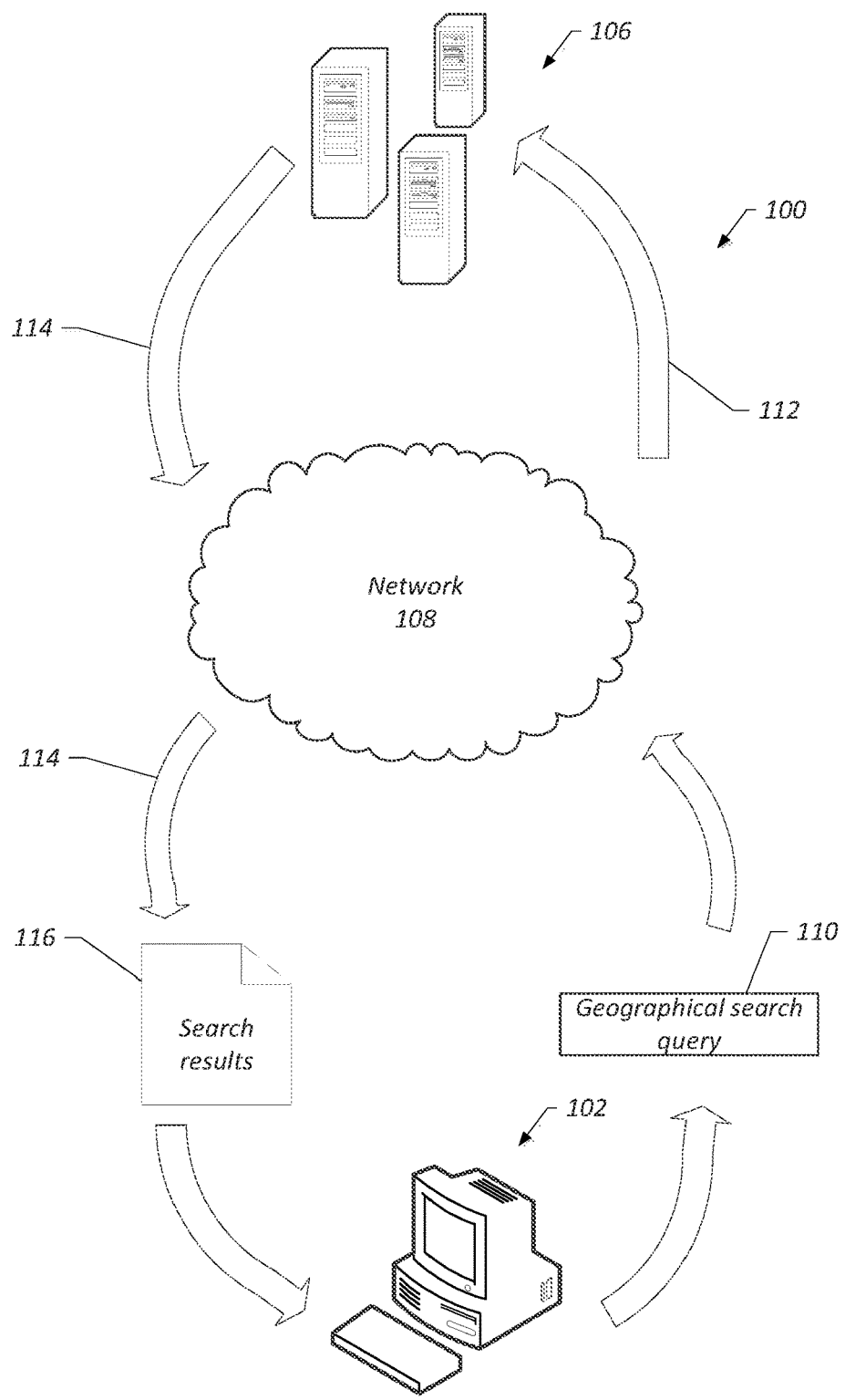
FIG. 1 is a diagram that illustrates a system in accordance with an embodiment of the present invention.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

As discussed in more detail below, provided in some embodiments are systems, methods, and computer-readable media for generating query templates for geographical search queries and interpreting geographical search queries. In some embodiments, query templates for geographical search queries are generated from search logs of previously executed geographical search queries. Unique queries are extracted from the search logs and interpretations for these queries are obtained from a map search engine and, in some embodiments, additional signals from user actions. Based on these interpretations, query templates having an arrangement of term types are extracted. Additionally, probability distributions for the query templates for a context, such as a locale, language, client type, etc., are determined. Each query template may have a probability of being a correct interpretation of a query for a context or multiple contexts. The query templates are indexed and used to provide interpretation candidates for geographical search queries.

A geographical search query is obtained and, based on the query templates described above, interpretation candidates for the query are determined. The probability of each interpretation candidate of each interpretation candidate being the correct interpretation may also be obtained and assigned to each interpretation candidates. Based on these probabilities and, in some embodiments, other criteria, the interpretation candidates for the geographical search query are scored and ranked.

FIG. 1 is a diagram that illustrates a system 100 in accordance with embodiments of the present invention. As shown in FIG. 1, the system 100 includes a client 102 in communication with servers 106 over a network 108. such that the client 102 transmits data to and receive data from the servers 106. In some embodiments, the client 102 includes thick-clients, thin-clients, or both. The client 102 may be, for example, computers, such smartphones, tablet computers, laptop computers, desktop computers, etc. In some embodiments, the system 100 may include multiple clients 102. The servers 106 may include a single server (in a discrete hardware component or as a virtual server) or multiple servers. The servers 106 may include web servers, application servers, or other types of servers. The servers 106 may be, for example, computers arranged in any physical and virtual configuration, such as computers in one or more data processing centers, a distributed computing environment, or other configuration. Such configurations may use the network 108 for communication or may communicate over other networks. The network 108 includes any suitable network, such as the Internet, an intranet, a local area network (LAN), a wide area network (WAN), or any other suitable network.

The servers 106 may include a geographic information system (GIS), a search engine, web services, or any combination of these systems. In such embodiments, the computer 102 transmits a geographical search query 110 to the servers 106. For example, the computer 102 presents a search web page or an interactive map to a user, and the user inputs a geographical search query on the computer 102 to search a geographical area. After receiving the inputted query, the computer 102 transmits a request 112 containing the query 110 to the servers 106.

The servers 106 receive and process the geographical search query 110. As described further below, the servers 106 interpret the geographical search query 110 based on query templates that correspond to possible interpretations of the geographical search query 110. After determining possible interpretations and selecting one or more interpretations of the geographical search query 110, the servers 106 provide results based on the selected interpretations, such as from a search engine. The system 100 respond to geographical search query from the client 102 by providing geographic data to the clients 102. The servers 106 send a response 114 containing the data responsive to the query over the network 108 to the client 102. As shown in FIG. 1, the response 114 includes search results 116. For example, for a given geographic search query for a type of entity located in a geographic area, the search results 116 include entities located in the geographic area.

A geographical search query may include one, two, three, four, or any number of terms in various arrangements. Such terms may include terms that form an address or other terms that do not form an address but are used to query a geographical search query. Geographical search queries may include, for example, "5 wall st ny," "$5^{th}$ ave ny," "Eiffel tower," and "new york." As described below, these terms and arrangements of terms may form the basis of query templates used to interpret geographical search queries received from a client computer.

Figure 2:
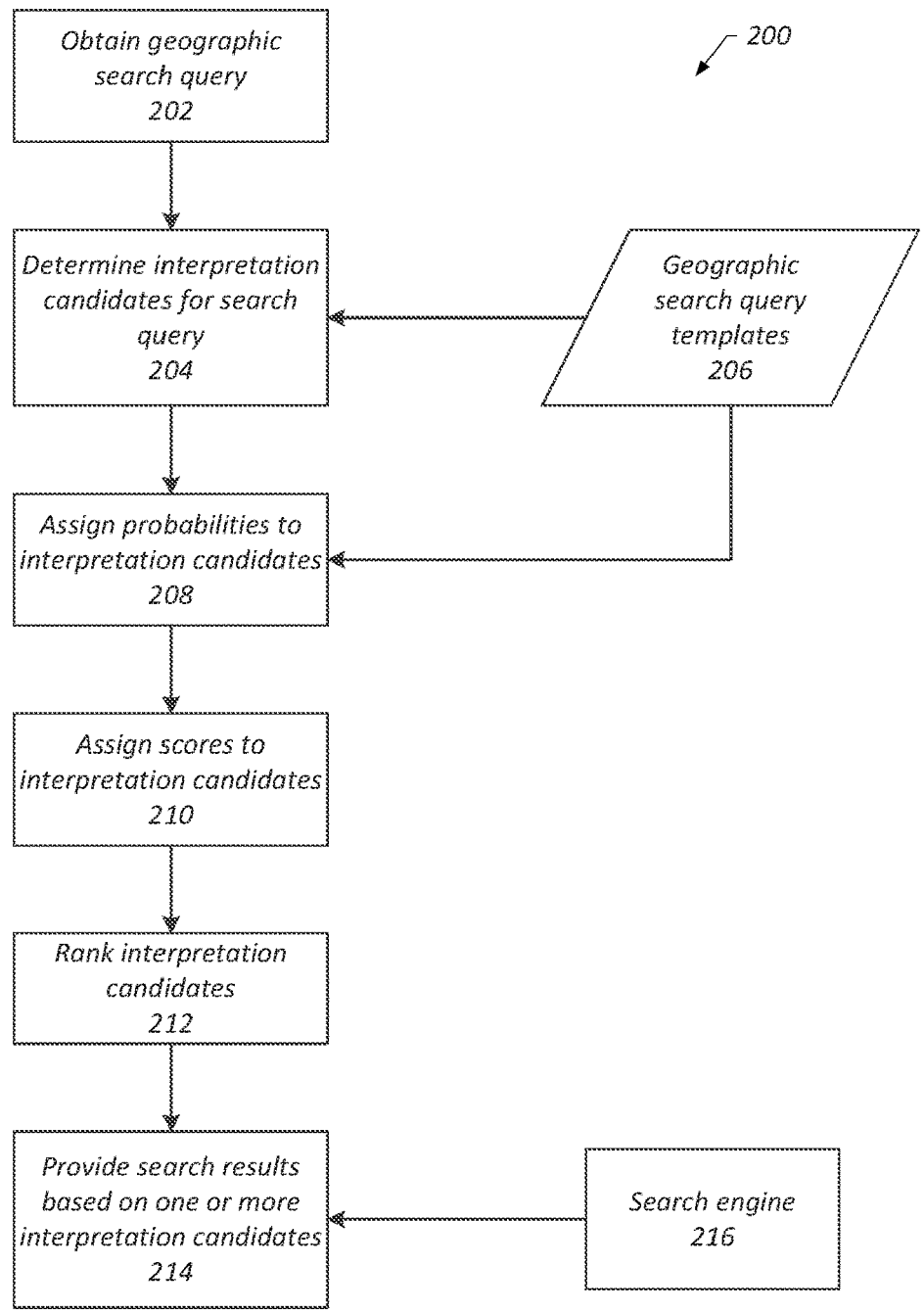
FIG. 2 is a block diagram depicting a process for interpretation geographical search queries in accordance with an embodiment of the present invention.

FIG. 2 depicts a process 200 for interpreting geographical search queries in accordance with embodiments of the present invention. Some or all steps of the process 200 may be implemented as executable code instructions stored on a non-transitory tangible machine readable medium and executed by a processor (e.g., one or more processors) of a computer (e.g., one or more computers). Initially, a geographical search query is obtained (block 202), such as from a client computer as described above. Next, interpretations candidates for the search query are determined (block 204), such as from geographic search query templates 206. As described below and illustrated in FIG. 3, the geographic search query templates are generated from previously executed geographical search queries and results.

Next, interpretation probabilities are assigned to the interpretation candidates for the geographical search query (block 208). Each interpretation candidate determined from the geographical search query templates 206 is associated with a probability indicating the likelihood of the interpretation candidate being the correct interpretation for the geographical search query. Based on these probabilities and, in some embodiments, other criteria, scores are assigned to the interpretation candidates for the geographical search query (block 210). For example, the scores, and subsequent rankings, may be based on other criteria, such as the popularity of a result produced by an interpretation candidate, the distance between a result produced by the interpretation candidate and a user's location, etc.

Next, the interpretation candidates are ranked based on the assigned scores (block 212). After ranking, results for the geographical search query are provided based on the interpretation candidates (block 214). The results are obtained from a geographical search engine 216, such as by executing one or more interpretation candidates by the geographical search engine 216. In some embodiments, the highest ranked interpretation candidate for the geographical search query is selected and used to provide a result to the geographical search query. In other embodiments, two, three, four, or more of the highest ranked interpretation candidates may be selected and used to provide multiple results to the geographical search query. In such an embodiment, the results are provided with a request to a user for confirmation of the correct interpretation candidate and result.

Figure 3:
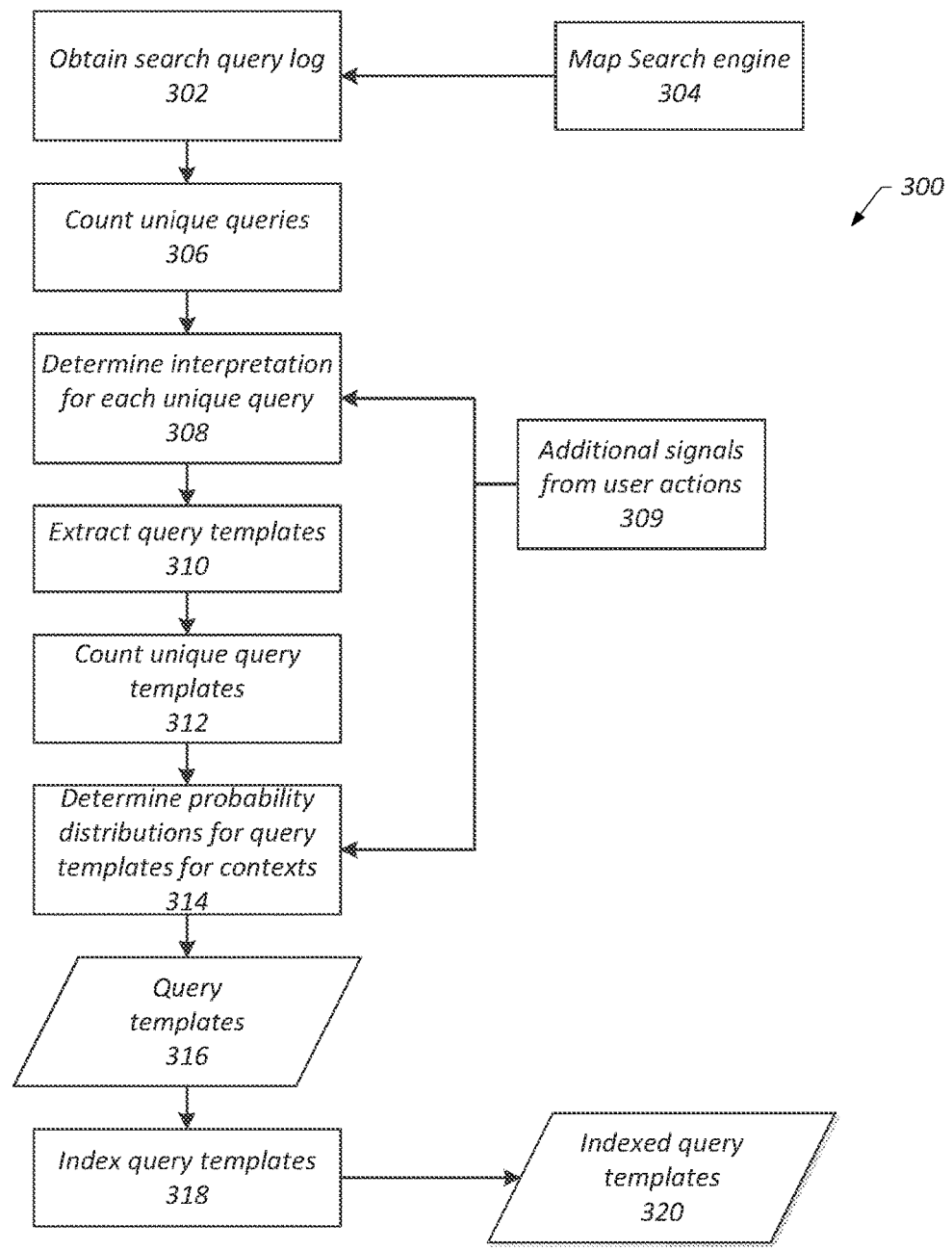
FIG. 3 is a block diagram depicting a process for interpretation generating query templates in accordance with an embodiment of the present invention.

As described above, a geographical search query is evaluated against query templates to determine interpretation candidates for the geographical search query. The query templates are generated (also referred to as "mined") from previously executed geographical search queries having a set of terms. FIG. 3 depicts a process 300 for generating query templates from previously executed geographical search query logs. Initially, geographical search query logs are obtained (block 302), such as from a map search engine (block 304). For example, the geographical search query logs may be logs of geographical search queries received from users and executed by the map search engine 304. Additionally, in some embodiments, the geographical search query logs are specific to a particular context, such as a particular language, locale, country, domain (e.g., .com, .de, etc.), other suitable contexts or combination thereof. In other embodiments, the geographical search query logs correspond to multiple contexts, such as multiple locales, languages, countries, domains, etc.

Next, unique queries from the query log are determined (block 306). The geographical search query logs may include duplicate queries. The duplicate queries are removed by determining the unique queries from the query logs for further processing. Next, the interpretation for each unique query is determined (block 308). In some embodiments, the interpretation for each unique query is determined by executing the query in the map search engine 304 or from query logs. Additionally, in some embodiments, the interpretation for a query is determined from additional signals from user actions (block 309). For example, in some embodiments, subsequent user actions after query execution may provide indications of a probable query interpretation. Such user actions may include, for example, a user selecting a search result, reading a web page of a search results, entering a subsequent query (e.g., refining a query by adding additional terms), and so on.

After determining the interpretations for each unique query, query templates are extracted from the interpretations (block 310). The query templates may include any number of term types in any arrangement. The term types may include, for example, address numbers, routes (e.g., streets, roads, or other transportation paths having names), cities, countries, postal codes, locales, localities, provinces, states, etc. Additionally, term types may include types for bodies of water, terrain features (e.g., mountains, contoured terrain), points of interest (e.g., landmarks, tourist attractions, etc.), political districts or divisions, transit system components (e.g., railway stations, bus stations, etc.), or other suitable term types. Thus, examples of the query templates may include: address route city state; city state; route address; route city state; route city; or any suitable arrangement of term types.

Next, the unique query templates are counted (block 312). After extracting query templates from the interpretations, any duplicate query templates are removed by counting the unique query templates. Next, the probability distributions for query templates for specific contexts are determined (block 314). As mentioned above, such contexts may include a language, a locale, a client type (e.g., desktop or mobile) or other contexts. Here again, in some embodiments, the probabilities may be determined using the additional signals from user actions (block 309). The probability distributions provide the likelihood that a query template is the correct interpretation for a given geographical search query for a context. For example, geographical search queries received from a first locale (e.g., Romania) may follow a different arrangement of term types than a geographical search query received from a second locale (e.g., the U.S.A.). Moreover, for a specific context, such as a specific locale, variations in the arrangement of terms in a geographical search query result in multiple query templates each having a different probability of being a correct interpretation of a query for that context. These probabilities may be used to evaluate a geographical search query received from a user. For example, such a geographical search query may include the query "zurich 9000". Based on the generated query templates, such a query may include interpretation candidates of "city postal code" and "street_number route". Each of these interpretation candidates may have a probability of being the correct interpretation. For example, the interpretation candidate "city postal code" may have a probability of 65%, and the interpretation candidate "street_number route" may have a probability 23%. As described above, this probability is used in the scoring and ranking of interpretation candidates for the geographical search query of "zurich 9000" when determining the appropriate result to the query.

The query templates 316 and, in some embodiments, the probability distributions, are stored and used in further processing. In some embodiments, the query templates 316 are indexed (block 318) to provide indexed query templates 320. For example, the indexing enables faster searching and retrieval of the query templates during processing a geographical search query. In some embodiments, the query template generation process is executed "offline" to predetermine query templates for use by in processing search queries. For example, after accumulating query logs and user actions, additional query templates may be generated and incorporated into the templates available for query interpretations. Further, in some embodiments, processing of queries, as described in FIG. 2, may be performed without templates using the map search engine. After sufficient data is accumulated, templates may be generated to improve performance and accuracy of query processing.

As mentioned above, the query templates are stored, such as in a data repository (e.g., a database). FIG. 4 depicts an example of a data structure 400 for storing query templates, transmitting query templates, or both. The data structure 400 may be stored as a message for packaging and transmission, as a record in a table of database, etc. The discussion of the data structure 400 refers to various attributes and values that are associated via any suitable structure, such as key-value pairs, rows and columns of a table, etc. The data structure 400 may include any number of columns and information suitable for storage with a query template. As shown in FIG.

4, attributes of the data structure 400 includes feature type 402, query template 404, language 406, country 408, count 410, and type 412.

The feature type 402 identifies the type of result produced by interpreting a query using the query template identified by the query template attribute 404. For example, a result identifies a route, a city, a province, a state, a country, or any other geographic area or identification. The query template 404 stores the sequence of term types for the query template.

Additional attributes of the data structure 400 identify various contexts for a query or query template. For example, the language 406 identifies the language of a query or query template. The country 408 identifies the country code where a query originated from, such as identifying the country by IP address, country code, or other identifier. The count 410 identifies the count of the template, such as the count determined above in FIG. 3 that is used in probability determinations for a query template. Finally, the data structure 400 includes a query type 412 identifying a type of a query. For example, the query type 412 may refer to a client type, e.g., desktop or mobile.

FIGS. 5A-5B depict various geographical search queries and corresponding interpretation candidates/query templates in accordance with embodiments of the present invention. As mentioned above, however, any one of the geographical search queries may have two or more interpretation candidates, although only one interpretation candidate is depicted in FIGS. 5A-5D.

FIG. 5A depicts a geographical search query 500 of "5 wall st. ny". As shown in FIG. 5A, this geographical search query 500 has an interpretation candidate 502 of "street_number route locality" such that the term "5" of the query 500 corresponds to a term type of "street_number", the term "wall st". of the query 500 corresponds to a term type of "route", and the term "ny" of the query corresponds to a term type of "locality". Thus, as described above, this interpretation candidate is derived from a query template have a term type arrangement of "street_number route locality".

FIG. 5B depicts a geographical search query 504 of "5th ave nt". As shown in FIG. 5B, this geographical search query 504 has an interpretation candidate 506 of "route locality". Based on this interpretation candidate, the term "5th ave" of the query 506 corresponds to a term type of "route" and the term "ny" of the query 506 corresponds to a term type of "locality". Thus, as described above, this interpretation candidate is derived from a query template have a term type arrangement of "route locality".

FIG. 5C depicts a geographical search query 508 of "eiffel tower". As shown in FIG. 5C, this geographical search query 508 has an interpretation candidate 510 of "entity_poi". Thus, based on the interpretation candidate 510, the term "eiffel tower" of the query 508 corresponds to a single term type ("entity_poi") for a point of interest. The query template for the interpretation candidate 510 may thus be the term type arrangement of "entity_poi".

Finally, FIG. 5D depicts a geographical search query 512 of "new york". As shown in FIG. 5D, this geographical search query 512 has an interpretation candidate 514 of "locality". Thus, based on the interpretation candidate 514, the term "new york" of the query 508 corresponds to a single term type of "locality". As mentioned above, a geographical search query may have multiple interpretation candidates. For example, "new york" may be interpreted based on query templates of term type "locality" and term type "state". Each of these query templates may have a different probability of being the correct interpretation, and selection of interopetation candidates is based on a scoring and ranking that incorporates these probabilities.

Figure 6:
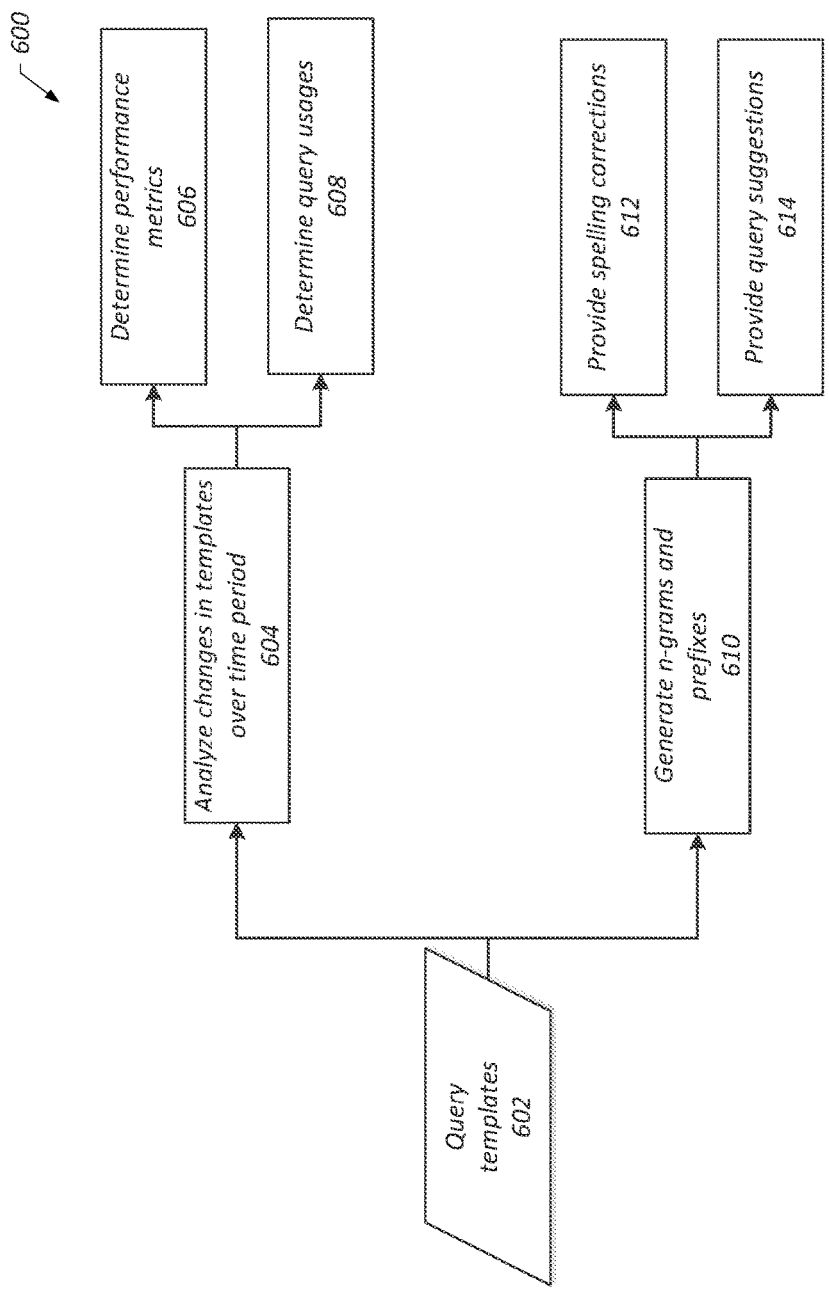
FIG. 6 is a block diagram depicting a process for providing of query templates to other processes for different determinations.

In some embodiments, query templates are provided to other processes for analysis and determination of different data. FIG. 6 depicts a process 660 illustrating the providing of query templates 602 to various other processes for different determinations. In some embodiments, for example, the changes to the query templates are analyzed over a time period (block 604). As noted above, query templates may be generated periodically, such as every hour, every day, every week, every month, etc. The query templates may thus be analyzed over such periods to determine changes to the query templates. For example, each query template from one previous period, two previous periods, three previous periods, four previous periods, are stored and compared to the query templates generated for the present period. For example, for query templates generated every two months, the query templates generated for one period may compared to query templates generate two months ago.

After analyzing query templates over time, performance metrics are determined (block 606). For example, if the query templates become less specific and contain less term types over time, this may indicate that the interpretations provided for the users' geographical search queries are relatively accurate, enabling users to specific a lower number of terms when entering a geographical search query. Additionally, in some embodiments analyzing the query templates over time is used to determine query usages (block 608). Because the queries are generated from previously executed queries that are received from users, the changes in the query templates over time correspond to changes in users' queries. The changes in users' queries may indicate how queries for a specific context are changing over time. For example, users in a specific locale may stop specifying certain terms in queries or may start including certain terms in queries, and such changes are reflected in the term types of the query templates.

Additionally, the query templates are used to generate n-grams and prefixes for various linguistic processes (block 610). For example, popular query templates for a context (e.g., the query templates having the highest probabilities or that provide the most popular interpretation candidates) are used as a basis for generating n-grams and prefixes for certain terms. In some embodiments, the n-grams and prefixes are used to provide spelling corrections (block 612), such as for subsequent geographical search queries or other queries. Additionally, in some embodiments, the n-grams and prefixes are used to provide query suggestions (block 614), such as for subsequent geographical search queries. For example, when a user begins to enter a geographical search query, an "autocomplete" suggestion may be provided for the query based on the n-grams and prefixes determined from popular query templates.

Figure 7:
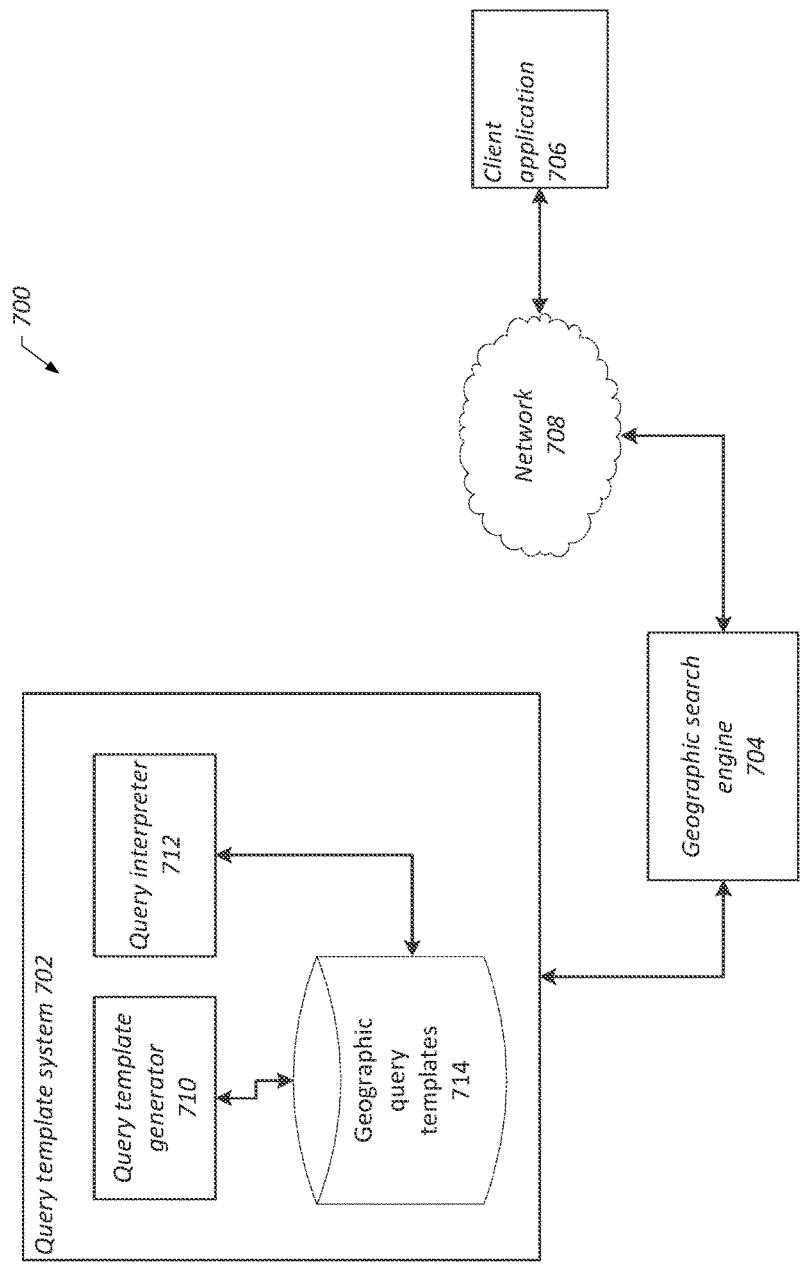
FIG. 7 is a block diagram illustrating a system in accordance with an embodiment of the present invention.

FIG. 7 is a block diagram of an exemplary system 700 for implementing the techniques described herein. The system 700 includes a query template system 702, a geographic search engine 704, and a client application 706. These components of the system 700 communicate over a network 708, such as the Internet, an intranet, a local area network (LAN), a wide area network (WAN), or any other suitable network. The query template system 702 includes a query template generator 710 and a query interpreter 712. Additionally, the query template system 702 includes a query templates repository 714 that includes generated query templates for one or more contexts.

The query template system 702 and geographic search engine 704 are implemented on one or more computers, such as on multiple computers of a data processing center or a distributed computing environment. For example, the various components of the system 700 may be executed on multiple computers, at multiple locations, in any suitable distribution of components. In such embodiments, data is transferred over a network or multiple networks among the various components. The client application 706 may be executed on a client computer, such as a smartphone, tablet computer, laptop computer, desktop computer, etc.

The query template generator 710 generates query templates from search logs as described above in FIG. 3, and may also obtain logs of user actions associated with queries. The query template generator 710 obtains search logs from the geographic search engine and stores generated query templates in the query templates repository 714. The query interpreter 712 receives and interprets a geographical search query, such as from the geographic search engine 704. For example, a geographical search query is input into the client application 706, transmitted to the geographic search engine 704 over the network 708, and provided to the query interpreter 712. As described above in FIG. 2, the query interpreter interprets a geographical search query based on the query templates stored in the query templates repository 714 and provide ranked interpretation candidates. Based on the ranked interpretation candidates, the geographic search engine 704 provides a result to the geographical search query. The result determined by the geographic search engine 704 and transmitted to the client application 706. The client application 706 receives the result and display the result to a user. As described above, in some embodiments the client application 706 receives multiple results based on multiple interpretation candidates and provide these results to the user for review and selection of one of the results.

Figure 8:
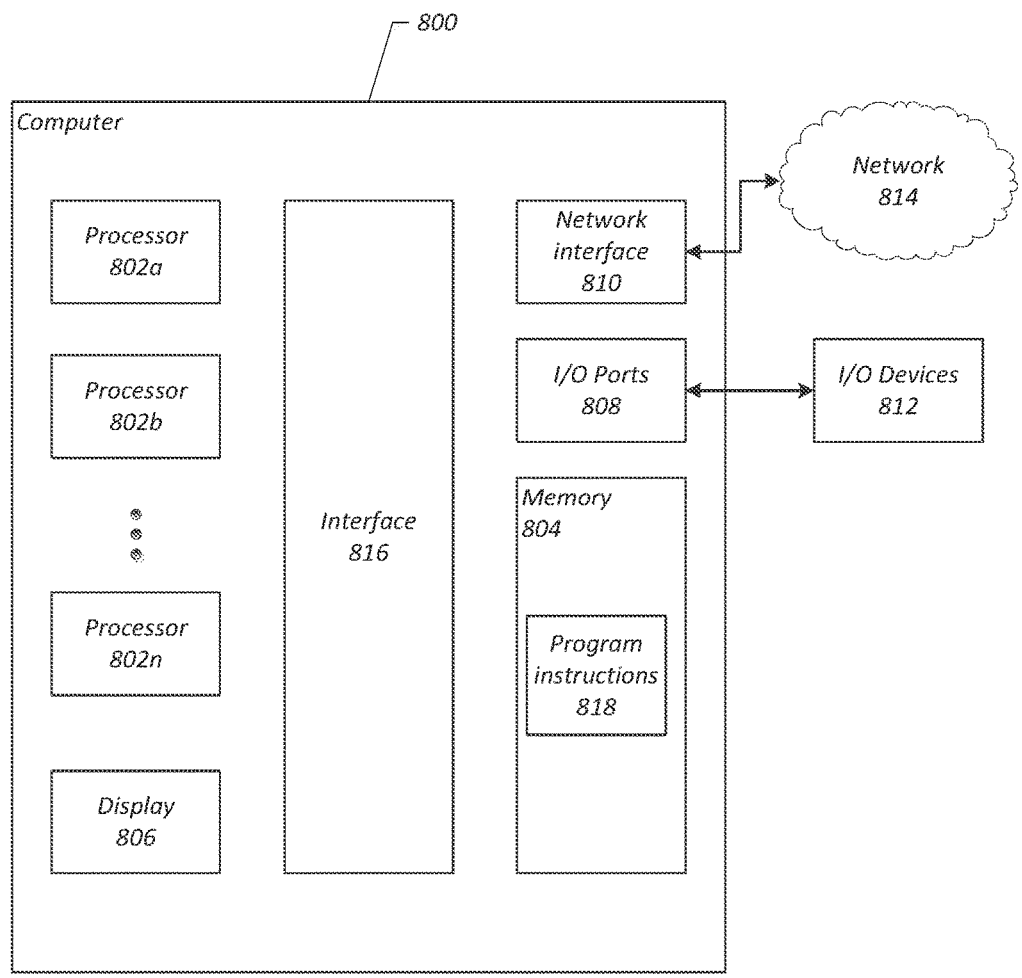
FIG. 8 is a block diagram of a computer in accordance with an embodiment of the present invention.

FIG. 8 depicts a computer 800 in accordance with an embodiment of the present invention. Various portions or sections of systems and methods described herein include or are executed on one or more computers similar to computer 800 and programmed as special-purpose machines executing some or all steps of methods described above as executable computer code. Further, processes and modules described herein may be executed by one or more processing systems similar to that of computer 800.

The computer 800 may include various internal and external components that contribute to the function of the device and which may allow the computer 800 to function in accordance with the techniques discussed herein. As will be appreciated, various components of computer 800 may be provided as internal or integral components of the computer 800 or may be provided as external or connectable components. It should further be noted that FIG. 8 depicts merely one example of a particular implementation and is intended to illustrate the types of components and functionalities that may be present in computer 800.

Computer 800 may include any combination of devices or software that may perform or otherwise provide for the performance of the techniques described herein. For example, computer 800 may include or be a combination of a cloud-computing system, a data center, a server rack or other server enclosure, a server, a virtual server, a desktop computer, a laptop computer, a tablet computer, a mobile telephone, a personal digital assistant (PDA), a media player, a game console, a vehicle-mounted computer, or the like. The computer 800 may be a unified device providing any one of or a combination of the functionality of a media player, a cellular phone, a personal data organizer, a game console, and so forth. Computer 800 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

In addition, the computer 800 may allow a user to connect to and communicate through a network 814 (e.g., the Internet, a local area network, a wide area network, etc.) and to acquire data from a satellite-based positioning system (e.g., GPS). For example, the computer 800 may allow a user to communicate using e-mail, text messaging, instant messaging, or using other forms of electronic communication, and may allow a user to obtain the location of the device from a satellite-based positioning system, such as the location on an interactive geographic map. As shown in FIG. 8, the computer 800 may include one or more processors (e.g., processors 802a-802n) coupled to a memory 804, a display 806, I/O ports 808 and a network interface 810, via an interface 816.

In one embodiment, the display 806 may include a liquid crystal display (LCD) or an organic light emitting diode (OLED) display, although other display technologies may be used in other embodiments. The display 806 may display a user interface (e.g., a graphical user interface). The display 806 may also display various function and system indicators to provide feedback to a user, such as power status, call status, memory status, etc. These indicators may be incorporated into the user interface displayed on the display 806. In accordance with some embodiments, the display 806 may include or be provided in conjunction with touch sensitive elements through which a user may interact with the user interface. Such a touch-sensitive display may be referred to as a "touch screen" and may also be known as or called a touch-sensitive display system.

The processor 802 may provide the processing capability required to execute the operating system, programs, user interface, and any functions of the computer 800. The processor 802 may include one or more processors and include "general-purpose" microprocessors and special purpose microprocessors, such as ASICs. For example, the processor 802 may include one or more reduced instruction set (RISC) processors, such as those implementing the Advanced RISC Machine (ARM) instruction set. Additionally, the processor 802 may include single-core processors and multicore processors and may include graphics processors, video processors, and related chip sets. A processor may receive instructions and data from a memory (e.g., system memory 804). Accordingly, computer 800 may be a uni-processor system including one processor (e.g., processor 802a), or a multi-processor system including any number of suitable processors (e.g., 802a-802n). Multiple processors may be employed to provide for parallel or sequential execution of one or more sections of the techniques described herein. Processes, such as logic flows, described herein may be performed by one or more programmable processors executing one or more computer programs to perform functions by operating on input data and generating corresponding output.

The memory 804 (which may include one or more tangible non-transitory computer readable storage medium) may include volatile memory and non-volatile memory accessible by the processor 802 and other components of the computer 800. The memory 804 may store a variety of information and may be used for a variety of purposes. For example, the memory 804 may store executable computer code, such as the firmware for the computer 800, an operating system for the computer 800, and any other programs or other executable code necessary for the computer 800 to function. The executable computer code may include program instructions 818 executable by a processor (e.g., one or more of processors 802a-802n) to implement one or more embodiments of the present invention. Instructions 818 may include modules of computer program instructions for implementing one or more techniques described herein with regard to various processing modules. Program instructions 818 may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, a subroutine. A computer program may or may not correspond to a file in a file system. A program may be stored in a section of a file that holds other programs or data (e.g., one or more scripts stored in a markup language document), in a single file dedicated to the program in question, or in multiple coordinated files (e.g., files that store one or more modules, sub programs, or sections of code). A computer program may be deployed to be executed on one or more computer processors located locally at one site or distributed across multiple remote sites and interconnected by a communication network. In addition, the memory 804 may be used for buffering or caching during operation of the computer 800.

As mentioned above, the memory 804 may include volatile memory, such as random access memory (RAM). The memory 804 may also include non-volatile memory, such as ROM, flash memory, a hard drive, any other suitable optical, magnetic, or solid-state storage medium, or a combination thereof. The memory 804 may store data files such as media (e.g., music and video files), software (e.g., for implementing functions on computer 800), preference information (e.g., media playback preferences), transaction information (e.g., information such as credit card information), wireless connection information (e.g., information that may enable media device to establish a wireless connection such as a telephone connection), telephone information (e.g., telephone numbers), and any other suitable data.

The interface 816 may include multiple interfaces and may couple various components of the computer 800 to the processor 802 and memory 804. In some embodiments, the interface 816, the processor 802, memory 804, and one or more other components of the computer 800 may be implemented on a single chip, such as a system-on-a-chip (SOC). In other embodiments, these components, their functionalities, or both may be implemented on separate chips. The interface 816 may be configured to coordinate I/O traffic between processors 802a-802n, system memory 804, network interface 810, I/O devices 812, other peripheral devices, or a combination thereof. The interface 816 may perform protocol, timing or other data transformations to convert data signals from one component (e.g., system memory 804) into a format suitable for use by another component (e.g., processors 802a-802n). The interface 816 may include support for devices attached through various types of peripheral buses, such as a variant of the Peripheral Component Interconnect (PCI) bus standard or the Universal Serial Bus (USB) standard.

The computer 800 may also include an input and output port 808 to allow connection of additional devices, such as I/O devices 812. Embodiments of the present invention may include any number of input and output ports 808, including headphone and headset jacks, universal serial bus (USB) ports, Firewire or IEEE-1394 ports, and AC and DC power connectors. Further, the computer 800 may use the input and output ports to connect to and send or receive data with any other device, such as other portable computers, personal computers, printers, etc.

The computer 800 depicted in FIG. 8 also includes a network interface 810, such as a wired network interface card (NIC), wireless (e.g., radio frequency) interface cards, etc. For example, the network interface 810 may receive and send electromagnetic signals and communicate with communications networks and other communications devices via the electromagnetic signals. The network interface 810 may include known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The network interface 810 may communicate with networks (e.g., network 814), such as the Internet, an intranet, a cellular telephone network, a wireless local area network (LAN), a metropolitan area network (MAN), or other devices by wireless communication. The communication may use any suitable communications standard, protocol and technology, including Ethernet, Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11a, IEEE 802.11b, IEEE 802.11g or IEEE 802.11n), voice over Internet Protocol (VoIP), Wi-MAX, a protocol for email (e.g., Internet message access protocol (IMAP) or post office protocol (POP)), messaging (e.g., extensible messaging and presence protocol (XMPP), Session Initiation Protocol for Instant Messaging and Presence Leveraging Extensions (SIMPLE), Instant Messaging and Presence Service (IMPS)), Multimedia Messaging Service (MMS), Short Message Service (SMS), or any other suitable communication protocol.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method for interpreting geographical search queries, comprising:
   receiving a geographical search query from a client computer;
   obtaining, by one or more processors, a plurality of geographical search queries, each of the plurality of geographical search queries having a plurality of terms;
   determining, by the one or more processors, a plurality of query templates based on the plurality of geographical search queries, each of the plurality of query templates including an ordering of several geographic term types determined from the plurality of terms, wherein at least some of the plurality of query templates have a different ordering of geographic term types for different locales or languages;
   determining, by the one or more processors, one or more query templates of the plurality of query templates corresponding to different locales or languages;
   providing, by the one or more processors, the one or more query templates as one or more interpretation candidates for interpreting the geographical search query corresponding to a locale or language from which the geographical search query was received; and
   providing, by the one or more processors, search results to the client computer for the geographical search query based on the one or more interpretation candidates.

2. The computer-implemented method of claim 1, wherein determining the one or more query templates corresponding to different locales or languages includes determining probability distributions for the plurality of query templates.

3. The computer-implemented method of claim 2, wherein the probability distributions provide a likelihood that a certain query template is a correct interpretation for a given geographical search query and a given locale or language.

4. The computer-implemented method of claim 3, further comprising:
   selecting, by the one or more processors, one of the one or more interpretation candidates; and
   obtaining, by the one or more processors, the search results for the geographic search query based on the selected interpretation candidate.

5. The computer-implemented method of claim 4, wherein selecting one of the one or more interpretation candidates includes:
   ranking, by the one or more processors, the one or more interpretation candidates based on the likelihoods that each of the interpretation candidates is the correct interpretation for the given geographic search query and the given locale or language; and
   selecting, by the one or more processors, a highest ranking interpretation candidates of the one or more interpretation candidates.

6. The computer-implemented method of claim 1, wherein the several geographic term types include two or more of: a number of an address, a route, a locality, a type of entity, a province, a state, and a country.

7. The computer-implemented method of claim 1, wherein the at least some of the plurality of query templates having a different ordering of geographic term types for different locales or languages include a first query template having a plurality of geographic term types in a first order for a first locale or first language and a second query template having the same plurality of geographic term types in a second order different from the first order for a second locale or second language.

8. The computer-implemented method of claim 1, wherein the plurality of query templates are determined based on the plurality of geographical search queries and user actions associated with the plurality of geographical search queries, the user actions including at least one of: (i) selecting a search result or (ii) refining the geographical search query.

9. A computing device for interpreting geographical search queries, the computing device comprising:
   one or more processors; and
   a non-transitory computer-readable memory coupled to the one or more processors and storing instructions thereon that, when executed by the one or more processors, cause the computing device to:
   receive a geographical search query from a client computer;
   obtain a plurality of geographical search queries, each of the plurality of geographical search queries having a plurality of terms;
   determine a plurality of query templates based on the plurality of geographical search queries, each of the plurality of query templates including an ordering of several geographic term types determined from the plurality of terms, wherein at least some of the plurality of query templates have a different ordering of geographic term types for different locales or languages;
   determine one or more query templates of the plurality of query templates corresponding to different locales or languages;
   provide the one or more query templates as one or more interpretation candidates for interpreting the geographical search query corresponding to a locale or language from which the geographical search query was received; and provide search results to the client computer for the geographical search query based on the one or more interpretation candidates.

10. The computing device of claim 9, wherein to determine the one or more query templates corresponding to different locales or languages, the instructions cause the computing device to determine probability distributions for the plurality of query templates.

11. The computing device of claim 10, wherein the probability distributions provide a likelihood that a certain query template is a correct interpretation for a given geographical search query and a given locale or language.

12. The computing device of claim 11, wherein the instructions further cause the computing device to:
  select one of the one or more interpretation candidates; and
  obtain the search results for the geographic search query based on the selected interpretation candidate.

13. The computing device of claim 11, wherein to select one of the one or more interpretation candidates, the instructions cause the computing device to:
  rank the one or more interpretation candidates based on the likelihoods that each of the interpretation candidates is the correct interpretation for the given geographic search query and the given locale or language; and
  select a highest ranking interpretation candidates of the one or more interpretation candidates.

14. The computing device of claim 9, wherein the several geographic term types include two or more of: a number of an address, a route, a locality, a type of entity, a province, a state, and a country.

15. The computing device of claim 9, wherein the at least some of the plurality of query templates having a different ordering of geographic term types for different locales or languages include a first query template having a plurality of geographic term types in a first order for a first locale or first language and a second query template having the same plurality of geographic term types in a second order different from the first order for a second locale or second language.

16. The computing device of claim 9, wherein the plurality of query templates are determined based on the plurality of geographical search queries and user actions associated with the plurality of geographical search queries, the user actions including at least one of: (i) selecting a search result or (ii) refining the geographical search query.

17. A computer-implemented method for displaying search results in response to geographical search queries, comprising:
  receiving, at a client device, a geographical search query from a user at a first locale or in a first language, the geographical search query having a plurality of terms with an ordering of geographic term types;
  obtaining, by the client device, a first set of search results from a remote computing device in response to the geographical search query, the first set of search results based on a first query template of a plurality of query templates having an ordering of geographic term types corresponding to the first locale or first language from which the geographical search query was received;
  displaying, by the client device, the first set of search results;
  receiving, at the client device, a geographical search query from the user at a second locale or in a second language, the second locale or second language different from the first locale or first language, and the geographical search query having a plurality of terms with an ordering of geographic term types;
  obtaining, by the client device, a second set of search results from the remote computing device in response to the geographical search query, the second set of search results based on a second query template of a plurality of query templates having a different ordering of geographic term types than the first query template and corresponding to the second locale or second language from which the geographical search query was received; and
  displaying, by the client device, the second set of search results.

18. The computer-implemented method of claim 13, wherein the geographic term types include two or more of: a number of an address, a route, a locality, a type of entity, a province, a state, and a country.

* * * * *